US009858115B2

United States Patent
Chang et al.

(10) Patent No.: US 9,858,115 B2
(45) Date of Patent: Jan. 2, 2018

(54) TASK SCHEDULING METHOD FOR DISPATCHING TASKS BASED ON COMPUTING POWER OF DIFFERENT PROCESSOR CORES IN HETEROGENEOUS MULTI-CORE PROCESSOR SYSTEM AND RELATED NON-TRANSITORY COMPUTER READABLE MEDIUM

(71) Applicant: MEDIATEK INC., Hsin-Chu (TW)

(72) Inventors: Ya-Ting Chang, Hsinchu (TW); Jia-Ming Chen, Hsinchu County (TW); Yu-Ming Lin, Taipei (TW); Yin Chen, Taipei (TW); Hung-Lin Chou, Hsinchu County (TW); Yeh-Ji Chou, Taoyuan County (TW); Shou-Wen Ho, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/516,566

(22) Filed: Oct. 16, 2014

(65) Prior Publication Data

US 2015/0121388 A1 Apr. 30, 2015

Related U.S. Application Data

(63) Continuation-in-part of application No. 14/480,646, filed on Sep. 9, 2014, now abandoned.
(Continued)

(51) Int. Cl.
*G06F 9/46* (2006.01)
*G06F 9/48* (2006.01)
*G06F 9/52* (2006.01)

(52) U.S. Cl.
CPC ............ *G06F 9/4881* (2013.01); *G06F 9/52* (2013.01); *G06F 2209/483* (2013.01); *G06F 2209/501* (2013.01)

(58) Field of Classification Search
CPC ................................ G06F 9/4881; G06F 9/52
(Continued)

(56) References Cited

U.S. PATENT DOCUMENTS

| 4,908,750 A * | 3/1990 | Jablow | G06F 9/4881 718/103 |
| 6,205,150 B1 * | 3/2001 | Ruszczyk | H04L 47/564 370/412 |

(Continued)

FOREIGN PATENT DOCUMENTS

| CN | 102171627 A | 8/2011 |
| CN | 102222022 A | 10/2011 |

(Continued)

OTHER PUBLICATIONS

Xu et al., "A genetic algorithm for task scheduling on heterogeneous computing systems using multiple priority queues", 2014.*
(Continued)

*Primary Examiner* — Phillip H Nguyen
(74) *Attorney, Agent, or Firm* — Winston Hsu (57) ABSTRACT

A task scheduling method is applied to a heterogeneous multi-core processor system. The heterogeneous multi-core processor system has at least one first processor core and at least one second processor core. The task scheduling method includes: referring to task priorities of tasks of the heterogeneous processor cores to identify at least one first task of the tasks that belongs to a first priority task group, wherein each first task belonging to the first priority task group has a task priority not lower than task priorities of other tasks not belonging to the first priority task group; and dispatching at least one of the at least one first task to at least one run queue of at least one of the at least one first processor core.

20 Claims, 5 Drawing Sheets

Related U.S. Application Data (60) Provisional application No. 61/897,362, filed on Oct. 30, 2013, provisional application No. 61/897,362, filed on Oct. 30, 2013.

(58) Field of Classification Search
USPC .................................................. 718/102–104
See application file for complete search history.

(56) References Cited

U.S. PATENT DOCUMENTS

| | | | | |
|---|---|---|---|---|
| 6,513,057 | B1* | 1/2003 | McCrory | G06F 9/4881 710/6 |
| 8,806,503 | B2* | 8/2014 | Becchi | G06F 12/0284 718/104 |
| 8,959,370 | B2* | 2/2015 | Zomaya | 713/300 |
| 9,443,095 | B2* | 9/2016 | Lahteenmaki | G06F 21/74 |
| 2006/0095911 | A1* | 5/2006 | Uemura | G06F 1/206 718/100 |
| 2006/0161922 | A1* | 7/2006 | Amano | G06F 9/4881 718/103 |
| 2007/0113231 | A1* | 5/2007 | Honmura | G06F 9/4881 718/100 |
| 2007/0283358 | A1* | 12/2007 | Kasahara | G06F 9/5044 718/104 |
| 2009/0172683 | A1* | 7/2009 | Lin | G06F 9/505 718/103 |
| 2010/0070740 | A1* | 3/2010 | Allen | G06F 9/5038 712/30 |
| 2010/0211954 | A1* | 8/2010 | Bauer | G06F 9/4881 718/103 |
| 2011/0088041 | A1* | 4/2011 | Alameldeen | G06F 9/505 718/105 |
| 2012/0159501 | A1* | 6/2012 | Lee | G06F 9/4881 718/103 |
| 2013/0074088 | A1* | 3/2013 | Purcell | G06F 9/4881 718/103 |
| 2014/0059558 | A1 | 2/2014 | Davis | |
| 2015/0324234 | A1* | 11/2015 | Chang | G06F 9/5033 718/104 |

FOREIGN PATENT DOCUMENTS

| | | |
|---|---|---|
| CN | 102955685 A | 3/2013 |
| CN | 103019810 A | 4/2013 |
| CN | 103164278 A | 6/2013 |

OTHER PUBLICATIONS

Zhang et al., "Dynamic Heterogeneity-Aware Resource Provisioning in the Cloud", 2014.*

* cited by examiner

TASK SCHEDULING METHOD FOR DISPATCHING TASKS BASED ON COMPUTING POWER OF DIFFERENT PROCESSOR CORES IN HETEROGENEOUS MULTI-CORE PROCESSOR SYSTEM AND RELATED NON-TRANSITORY COMPUTER READABLE MEDIUM

CROSS REFERENCE TO RELATED APPLICATIONS

This is continuation-in-part (CIP) of co-pending U.S. application Ser. No. 14/480,646 (filed on Sep. 9, 2014), which claims the benefit of U.S. provisional application No. 61/897,362 (filed on Oct. 30, 2013). This CIP application further claims the benefit of U.S. provisional application No. 61/897,362 (filed on Oct. 30, 2013). The entire contents of the related applications are incorporated herein by reference.

BACKGROUND

The disclosed embodiments of the present invention relate to a task scheduling scheme, and more particularly, to a task scheduling method for dispatching tasks (e.g., real-time tasks) based on computing power of different processor cores in a heterogeneous multi-core processor system and a related non-transitory computer readable medium.

A multi-core system becomes popular nowadays due to increasing need of computing power. Hence, an operating system (OS) of the multi-core system may need to decide task scheduling for different processor cores to maintain good load balance and/or high system resource utilization. Regarding a heterogeneous multi-core system, it may have processor cores that are not identical to each other. For example, the heterogeneous multi-core system may include a first processor core and a second processor core, where the first processor core may have first processor architecture, and the second processor core may have second processor architecture that is different from the first processor architecture. Hence, if the same task is running on the first processor core and the second processor core, the processing time needed by the first processor core to finish execution of instructions of the task may be different from the processing time needed by the second processor core to finish execution of the same instructions of the task.

In general, the first processor core and the second processor core implemented in the heterogeneous multi-core system may have different computing power due to different processor architecture. For example, the first processor core may be a performance oriented processor core, while the second processor core may be a power-saving oriented processor core. Hence, the computing power/capability of the first processor core may be greater than that of the second processor core. However, a conventional task scheduling scheme is not aware of the different computing power of processor cores in the heterogeneous multi-core system. As a result, a task with the higher task priority may be dispatched to the second processor core with lower computing power for execution, and another task with the lower task priority may be dispatched to the first processor core with higher computing power for execution. This would lead to priority inversion. That is, the task with higher task priority may have longer latency and response time due to that execution of the task with lower task priority is accomplished/terminated before the execution of the task with higher task priority.

Thus, there is a need for an innovative task scheduling design which is capable of properly dispatching tasks to different processor cores of a heterogeneous multi-core system based on different computing power possessed by the processor cores.

SUMMARY

In accordance with exemplary embodiments of the present invention, a task scheduling method for dispatching tasks (e.g., real-time tasks) based on computing power of different processor cores in a heterogeneous multi-core processor system and a related computer readable medium are proposed to solve the above-mentioned problem.

According to a first aspect of the present invention, an exemplary task scheduling method for a heterogeneous multi-core processor system is disclosed. The heterogeneous multi-core processor system includes at least one first processor core each having first computing power and at least one second processor core each having second computing power lower than the first computing power. The exemplary task scheduling method includes: referring to task priorities of tasks of the heterogeneous processor cores to identify at least one first task of the tasks that belongs to a first priority task group, wherein each first task belonging to the first priority task group has a task priority not lower than task priorities of other tasks not belonging to the first priority task group; and dispatching at least one of the at least one first task to at least one run queue of at least one of the at least one first processor core.

According to a second aspect of the present invention, another exemplary task scheduling method for a heterogeneous multi-core processor system is disclosed. The heterogeneous multi-core processor system includes at least one first processor core each having first computing power and at least one second processor core each having second computing power lower than the first computing power. The exemplary task scheduling method includes: referring to task priorities of tasks of the heterogeneous processor cores to identify at least one first task of the tasks that belongs to a first priority task group and identify at least one second task of the tasks that belongs to a second priority task group, wherein each first task belonging to the first priority task group has a task priority not lower than task priorities of other tasks not belonging to the first priority task group, each second task belonging to the second priority task group has a task priority not lower than task priorities of other tasks not belonging to the first priority task group and the second priority task group; and dispatching at least one of the at least one second task to at least one run queue of at least one of the at least one second processor core.

In addition, a non-transitory computer readable medium storing a task scheduling program code is also provided, wherein when executed by the heterogeneous multi-core processor system, the task scheduling program code causes the heterogeneous multi-core processor system to perform any of the aforementioned task scheduling methods.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
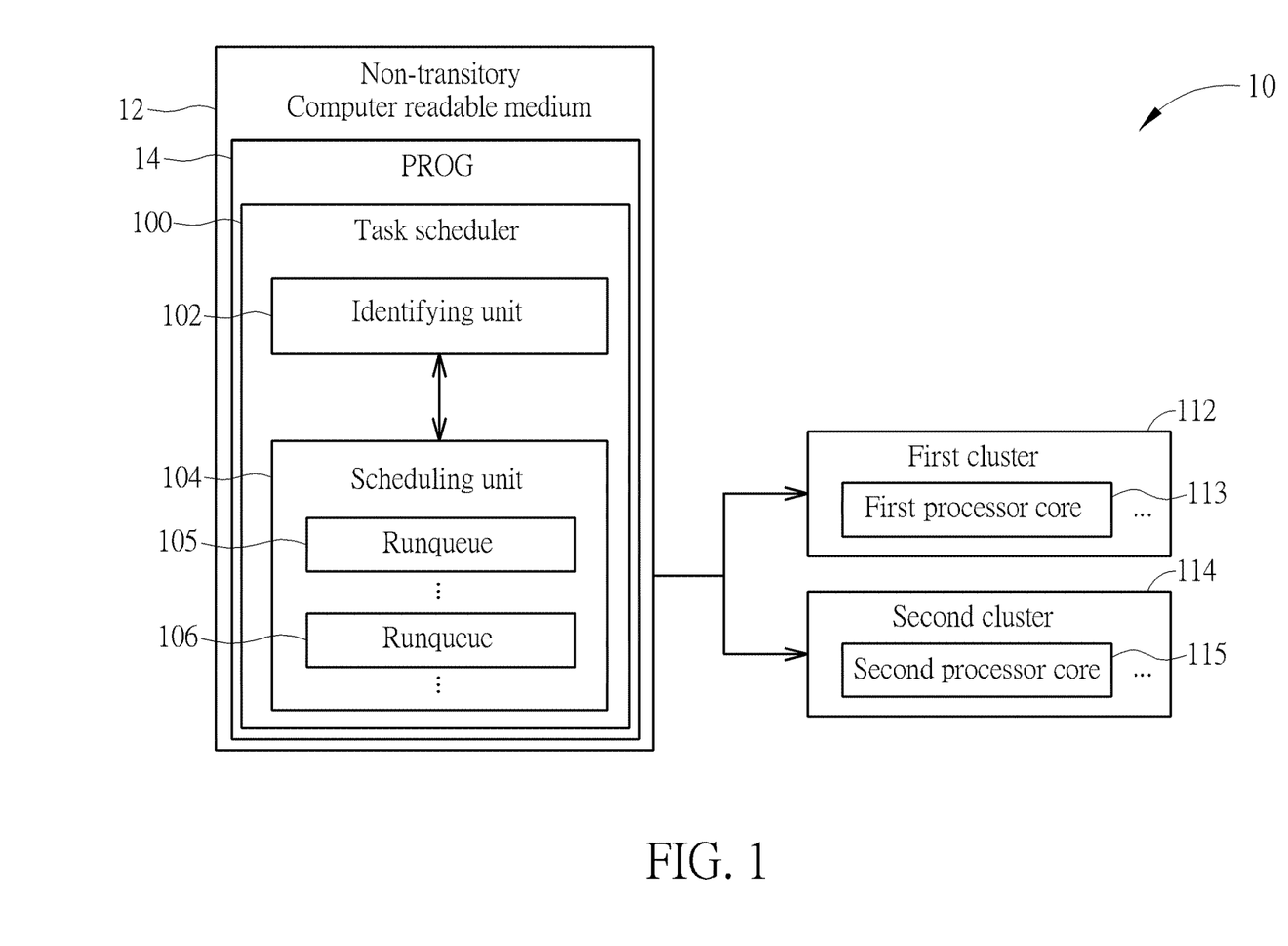
FIG. 1 is a diagram illustrating a heterogeneous multi-core processor system according to an embodiment of the present invention.

FIG. 1 is a diagram illustrating a heterogeneous multi-core processor system according to an embodiment of the present invention. The heterogeneous multi-core processor system 10 may be implemented in a portable device, such as a mobile phone, a tablet, a wearable device, etc. However, this is not meant to be a limitation of the present invention. That is, any electronic device using the proposed task scheduling method falls within the scope of the present invention. In this embodiment, the heterogeneous multi-core processor system 10 may have a task scheduler 100 and a plurality of clusters including a first cluster 112 and a second cluster 114. The task scheduler 100 may be coupled to the first cluster 112 and the second cluster 114, and arranged to perform the proposed task scheduling method which is used to dispatch tasks to different processor cores based on computing power of the processor cores. In this embodiment, the task scheduler 100 may be part of an operating system (OS) such as a Linux-based OS or other OS kernel supporting multiprocessor task scheduling. Hence, the task scheduler 100 may be a software module running on the heterogeneous multi-core processor system 10. As shown in FIG. 1, the heterogeneous multi-core processor system 10 may have a non-transitory computer readable medium 12 such as a memory device. The non-transitory computer readable medium 12 may store a program code (PROG) 14. When the program code 14 is loaded and executed by the heterogeneous multi-core processor system 10, the task scheduler 100 may perform the proposed task scheduling method which will be detailed later.

Regarding the first cluster 112 and the second cluster 114, each cluster may be a group of processor cores. That is, the first cluster 112 may include one or more first processor cores 113, each having the same first processor architecture with the same first computing power; and the second cluster 114 may include one or more second processor cores 115, each having the same second processor architecture with the same second computing power. The second processor architecture may be different from the first processor architecture, and the second computing power may be lower than the first computing power. In one embodiment, each first processor core 113 may be regarded as a performance oriented processor core, and each second processor core 115 may be regarded as a power-saving oriented processor core. It should be noted that, based on the actual design consideration, the number of first processor cores 113 included in the first cluster 112 may be identical to or different from the number of second processor cores 115 included in the second cluster 114. Therefore, the proposed task scheduling method may be applied to the heterogeneous multi-core processor system 10 with any combination of different processor cores.

It should be noted that the term "multi-core processor system" may mean a multi-core system or a multi-processor system, depending upon the actual design. In other words, the proposed task scheduling method may be employed by any of the multi-core system and the multi-processor system. For example, concerning the multi-core system, all of the processor cores 113 may be disposed in one processor. For another example, concerning the multi-processor system, each of the processor cores 113 may be disposed in one processor. Hence, each of the clusters and 114 may be a group of processors.

The task scheduler 100 may include an identifying unit 102 and a scheduling unit 104. The identifying unit 102 may be configured to refer to task priorities of tasks of the heterogeneous multi-core processor system 10 to identify at least one first task of the tasks that belongs to a first priority task group and identify at least one second task of the tasks that belongs to a second priority task group. For example, the identifying unit 102 may be configured to compare task priorities of a plurality of tasks of the heterogeneous multi-core processor system 10, including task(s) currently running, task(s) waiting to run, etc., to determine which task(s) belong to the first priority task group (e.g., which task(s) should run on the first processor core(s) 113) and further determine which task(s) belong to the second priority task group (e.g., which task(s) should run on the second processor core(s) 115). The size of the first priority task group may depend on the number of first processor cores 113, and the size of the second priority task group may depend on the number of second processor cores 115. For example, the size of the first priority task group may be equal to the number of first processor cores 113, and the size of the second priority task group may be equal to the number of second processor cores 115.

The first priority task group may be treated as a highest priority task group, and the second priority task group may be treated as a next highest priority task group. Hence, each first task belonging to the first priority task group may have a task priority not lower than task priorities of other tasks not belonging to the first priority task group, and each second task belonging to the second priority task group may have a task priority not lower than task priorities of other tasks not belonging to the first priority task group and the second priority task group. In other words, any second task belonging to the second priority task group does not have a task priority higher than a task priority of any first task belonging to the first priority task group.

Based on the task identification result informed by the identifying unit 102, the scheduling unit 104 may set or adjust run queues of processor cores included in the heterogeneous multi-core processor system 10. Each processor core of the heterogeneous multi-core processor system 10 may be given a run queue managed by the scheduling unit 104. In this embodiment, one first processor core 113 in the first cluster 112 may be given a run queue 105, and one second processor core 115 in the second cluster 114 may be given a run queue 106. Hence, when there are multiple first processor cores 113, the scheduling unit 104 can manage multiple run queues 105 created for the first processor cores 113, respectively; and when there are multiple second processor cores 115, the scheduling unit 104 can manage multiple run queues 106 created for the second processor cores 115, respectively. The run queue may be a data structure which records a list of tasks, where the tasks may include a task that is currently running and other task(s) waiting to run. In some embodiments, a processor core may sequentially execute tasks included in a corresponding run queue according to task priorities of the tasks. In other words, the processor core may execute a task with higher task priority prior to executing a task with lower task priority. By way of example, but not limitation, the tasks may include programs, application program sub-components, or a combination thereof.

To reduce or avoid undesired priority inversion, the scheduling unit 104 may dispatch at least one of first task(s) belonging to the first priority task group (e.g., a highest priority task group) to at least one run queue of at least one of first processor core(s) 113 included in the first cluster 112 of the heterogeneous multi-core processor system 10, and/or dispatch at least one of second task(s) belonging to the second priority task group (e.g., a next highest priority task group) to at least one run queue of at least one of second processor core(s) 115 included in the second cluster 114 of the heterogeneous multi-core processor system 10. For better understanding of technical features of the present invention, several task scheduling operations performed by the scheduling unit 104 based the proposed task scheduling method are discussed as below.

For clarity and simplicity, the following assumes that the first cluster 112 includes two first processor cores 113 denoted by Core_11 and Core_12, and the second cluster 114 includes two second processor cores 115 denoted by Core_21 and Core_22. Hence, the scheduling unit 104 may assign two run queues 105 denoted by $RQ_{11}$ and $RQ_{12}$ to the first processor cores Core_11 and Core_12, respectively; and may assign two run queues 106 denoted by $RQ_{21}$ and $RQ_{22}$ for the second processor cores Core_21 and Core_22, respectively. The task priorities in a descending order is 0→1→2→3→4. Thus, a task with the task priority "0" is given the highest priority level among tasks executed by the heterogeneous multi-core processor system 10.

Figure 2:
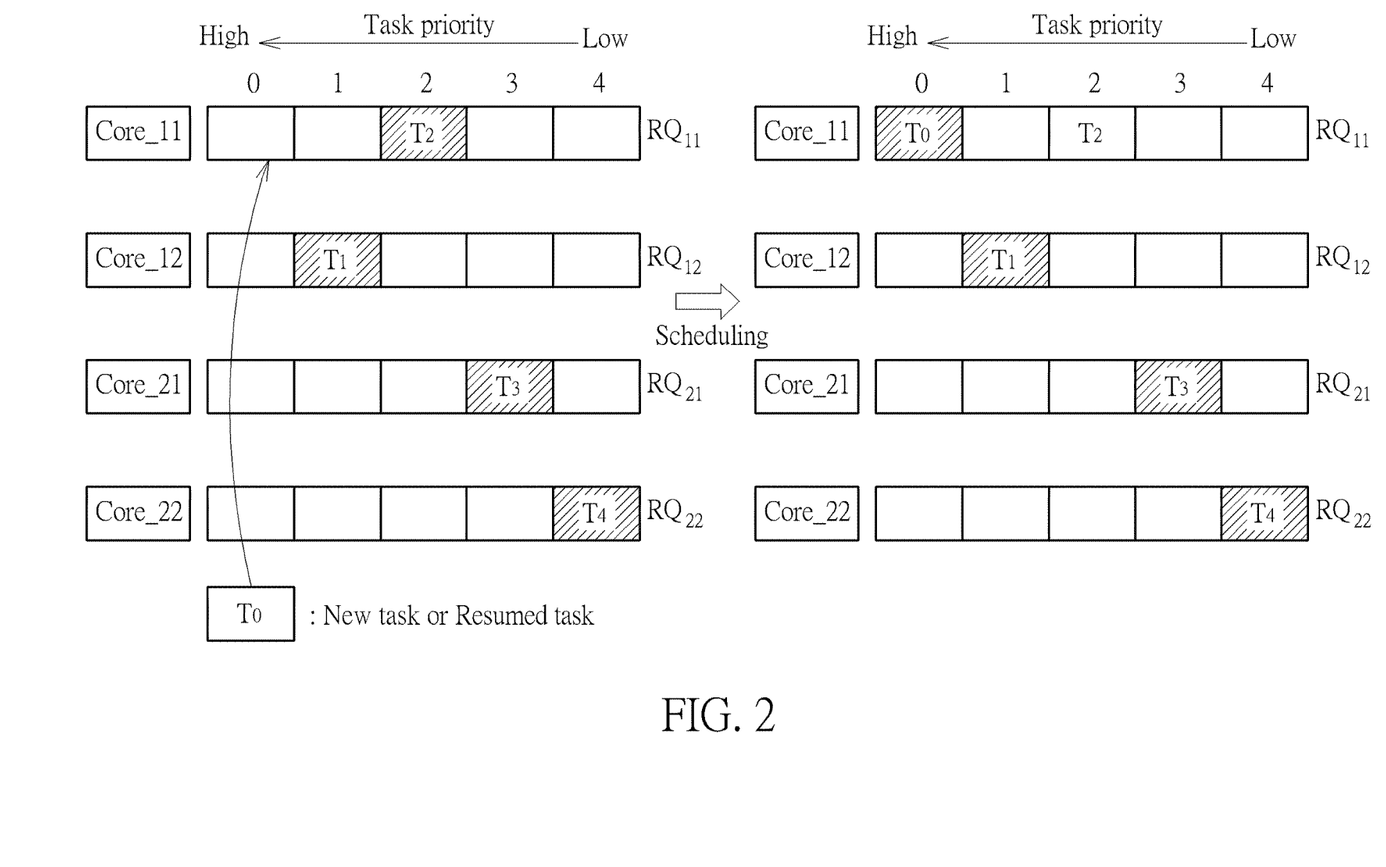
FIG. 2 is a diagram illustrating a first task scheduling operation which dispatches one first task belonging to the first priority task group (e.g., a highest priority task group) to a run queue of one first processor core with higher computing power.

FIG. 2 is a diagram illustrating a first task scheduling operation which dispatches one first task belonging to the first priority task group to a run queue of one first processor core with higher computing power. In this example, before a task $T_0$ with the task priority "0" is required to be added to one of the run queues $RQ_{11}$, $RQ_{12}$, $RQ_{21}$, $RQ_{22}$ for execution, the run queue $RQ_{11}$ may include a task $T_2$ with the task priority "2" and may further include other tasks with lower task priorities (not shown in FIG. 2); the run queue $RQ_{12}$ may include a task $T_1$ with the task priority "1" and may further include other tasks with lower task priorities (not shown in FIG. 2); the run queue $RQ_{21}$ may include a task $T_3$ with the task priority "3" and may further include other tasks with lower task priorities (not shown in FIG. 2); and the run queue $RQ_{22}$ may include a task $T_4$ with the task priority "4" and may further include other tasks with lower task priorities (not shown in FIG. 2). Before the task $T_0$ is added to one of the run queues $RQ_{11}$, $RQ_{12}$, $RQ_{21}$, and $RQ_{22}$, a task with the highest task priority in the run queue $RQ_{11}$ may be the task $T_2$, a task with the highest task priority in the run queue $RQ_{12}$ may be the task $T_1$, a task with the highest task priority in the run queue $RQ_{21}$ may be the task $T_3$, and a task with the highest task priority in the run queue $RQ_{22}$ may be the task $T_4$. Hence, the tasks $T_1$, $T_2$, $T_3$, and $T_4$ may be currently running on the first processor core Core_12, the first processor core Core_11, the second processor core Core_21, and the second processor core Core_22, respectively.

It is possible that the system may create a new task, or a task may be added to a wait queue to wait for requested system resource(s) and then resumed when the requested system resource(s) is available. In this example, the task $T_0$ may be a new task or a resumed task (e.g., a waking task currently being woken up) that is not included in run queues $RQ_{11}$, $RQ_{12}$, $RQ_{21}$, $RQ_{22}$ of the heterogeneous multi-core processor system 10, and the scheduling unit 104 needs to select one of the run queues $RQ_{11}$, $RQ_{12}$, $RQ_{21}$, $RQ_{22}$ and then dispatch the task $T_0$ to the selected run queue to thereby add the task $T_0$ to one of the run queues $RQ_{11}$, $RQ_{12}$, $RQ_{21}$, $RQ_{22}$ for execution.

As mentioned above, the identifying unit 102 may be configured to perform task identification to determine the first priority task group (e.g., a highest priority task group) and the second priority task group (e.g., a next highest priority task group), where the size of the first priority task group may depend on the number of first processor cores with the first computing power, and the size of the second priority task group may depend on the number of second processor cores with the second computing power lower than the first computing power. In this example, there are two first processor cores Core_11 and Core_12 and two second processor cores Core_21 and Core_22. Consider a case where the size of the first priority task group is set to be equal to the number of first processor cores, and the size of the second priority task group is set to be equal to the number of second processor cores. Hence, because task priorities of two tasks $T_0$ and $T_1$ are not lower than task priorities of other tasks $T_2$, $T_3$ and $T_4$, and task priorities of two tasks $T_2$ and $T_3$ are not higher than task priorities of tasks $T_0$ and $T_1$ and not lower than task priorities of other tasks (e.g., $T_4$), the identifying unit 102 may identify tasks $T_0$ and $T_1$ as tasks belonging to the first priority task group, and may identify tasks $T_2$ and $T_3$ as tasks belonging to the second priority task group. The task $T_0$ to be scheduled has the task priority "0" higher than task priorities "1" and "2" of tasks $T_1$ and $T_2$ currently running on the first processor cores Core_12 and Core_11 with higher computing power. Hence, the scheduling unit 104 may push the task $T_0$ (which is identified as a task belonging to the first priority task group) into one of the run queues $RQ_{11}$ and $RQ_{12}$ to reduce or avoid undesired priority inversion.

The scheduling unit 104 may select a specific run queue from run queues $RQ_{11}$ and $RQ_{12}$ of the first processor cores Core_11 and Core_12, and then add the task $T_0$ to the specific run queue. In one exemplary design, the highest task priority possessed by one task in the specific run queue is a lowest one of the highest task priorities possessed by tasks in the run queues $RQ_{11}$ and $RQ_{12}$. In this example, since the highest task priority "2" possessed by the task $T_2$ in the run queue $RQ_{11}$ is lower than the highest task priority "1" possessed by the task $T_1$ in the run queue $RQ_{12}$, the scheduling unit 104 may select the run queue $RQ_{11}$ as the specific run queue to which the task $T_0$ will be added.

After the task scheduling of the task $T_0$ is accomplished/terminated, the run queue $RQ_{11}$ may include at least the tasks $T_0$ and $T_2$, the run queue $RQ_{12}$ may include at least the task $T_1$, the run queue $RQ_{21}$ may include at least the task $T_3$, and the run queue $RQ_{22}$ may include at least the task $T_4$. By way of example, but not limitation, the scheduling unit 104 may further ensure that each first task belonging to the first priority task group is included in a run queue of one first processor core. As shown in FIG. 2, all of the tasks $T_0$ and $T_1$ belonging to the first priority task group are included in run queues $RQ_{11}$ and $RQ_{12}$ of the first processor cores Core_11 and Core_12.

It should be noted that the task priority "0" of the task $T_0$ is higher than the task priority "2" of the task $T_2$. Hence, after the task $T_0$ is added to the run queue $RQ_{11}$, the task $T_0$ may become a task currently running on the first processor core Core_11, and the task $T_2$ may become a task waiting to run on the first processor core Core_11.

Figure 3:
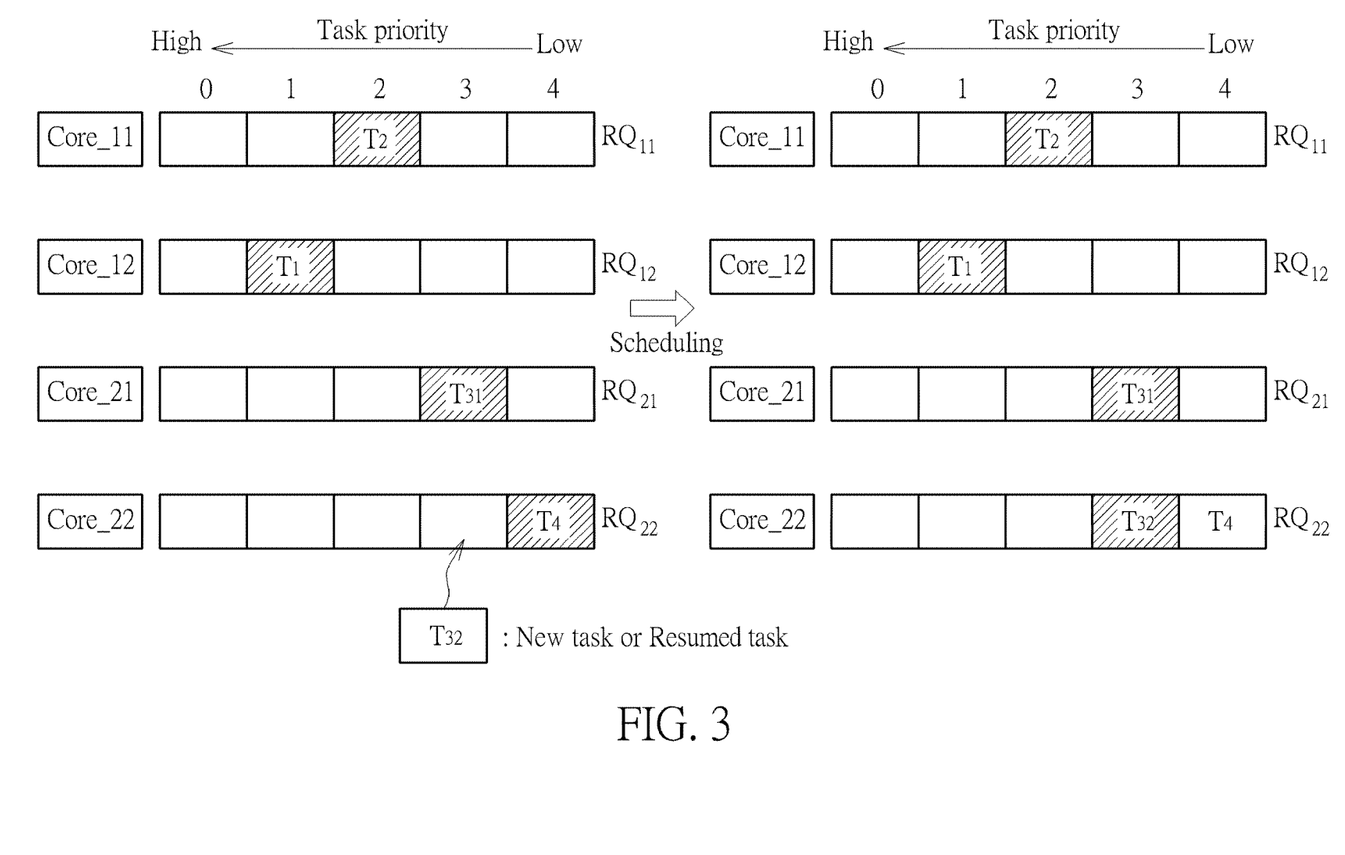
FIG. 3 is a diagram illustrating a second task scheduling operation which dispatches one second task belonging to the second priority task group (e.g., a next highest priority task group) to a run queue of one second processor core with lower computing power.

FIG. 3 is a diagram illustrating a second task scheduling operation which dispatches one second task belonging to the second priority task group to a run queue of one second processor core with lower computing power. In this example, before a task $T_{32}$ with the task priority "3" is required to be added to one of the run queues $RQ_{11}$, $RQ_{12}$, $RQ_{21}$, $RQ_{22}$ for execution, the run queue $RQ_{11}$ may include a task $T_2$ with the task priority "2" and may further include other tasks with lower task priorities (not shown in FIG. 3); the run queue $RQ_{12}$ may include a task $T_1$ with the task priority "1" and may further include other tasks with lower task priorities (not shown in FIG. 3); the run queue $RQ_{21}$ may include a task $T_{31}$ with the task priority "3" and may further include other tasks with lower task priorities (not shown in FIG. 3); and the run queue $RQ_{22}$ may include a task $T_4$ with the task priority "4" and may further include other tasks with lower task priorities (not shown in FIG. 3). A task with the highest task priority in the run queue $RQ_{11}$ may be the task $T_2$, a task with the highest task priority in the run queue $RQ_{12}$ may be the task $T_1$, a task with the highest task priority in the run queue $RQ_{21}$ may be the task $T_{31}$, and a task with the highest task priority in the run queue $RQ_{22}$ may be the task $T_4$. Hence, the tasks $T_1$, $T_2$, $T_{31}$, and $T_4$ may be currently running on the first processor core Core_12, the first processor core Core_11, the second processor core Core_21, and the second processor core Core_22, respectively.

As mentioned above, it is possible that the system may create a new task, or a task may be added to a wait queue to wait for requested system resource(s) and then resumed when the requested system resource(s) is available. In this example, the task $T_{32}$ may be a new task or a resumed task (e.g., a waking task currently being woken up) that is not included in run queues $RQ_{11}$, $RQ_{12}$, $RQ_{21}$, $RQ_{22}$ of the heterogeneous multi-core processor system 10, and the scheduling unit 104 may need to select one of the run queues $RQ_{11}$, $RQ_{12}$, $RQ_{21}$, $RQ_{22}$ and then dispatch the task $T_{32}$ to the selected run queue to thereby add the task $T_{32}$ to one of the run queues $RQ_{11}$, $RQ_{12}$, $RQ_{21}$, $RQ_{22}$ for execution.

In this example, there are two first processor cores Core_11 and Core_12 and two second processor cores Core_21 and Core_22. Consider a case where the size of the first priority task group is set to be equal to the number of first processor cores, and the size of the second priority task group is set to be equal to the number of second processor cores. Hence, because task priorities of two tasks $T_1$ and $T_2$ are not lower than task priorities of other tasks (e.g., $T_{31}$, $T_{32}$ and $T_4$), and task priorities of two tasks $T_{31}$ and $T_{32}$ are not higher than task priorities of the tasks $T_1$ and $T_2$ and not lower than task priorities of other tasks (e.g., $T_4$), the identifying unit 102 may identify tasks $T_1$ and $T_2$ as tasks belonging to the first priority task group, and may identify tasks $T_{31}$ and $T_{32}$ as tasks belonging to the second priority task group.

The task $T_{32}$ to be scheduled has the task priority "3" lower than task priorities "1" and "2" of tasks $T_1$ and $T_2$, where the tasks $T_1$ and $T_2$ are identified as tasks belonging to the first priority task group and currently running on the first processor cores Core_12 and Core_11 with higher computing power. Hence, the scheduling unit 104 may push the task $T_{32}$ (which is identified as a task belonging to the second priority task group) into one of the run queues $RQ_{21}$ and $RQ_{22}$ to reduce or avoid undesired priority inversion.

The scheduling unit 104 may select a specific run queue from run queues $RQ_{21}$ and $RQ_{22}$ of the second processor cores Core_21 and Core_22, and add the task $T_{32}$ to the specific run queue. For example, the highest task priority possessed by one task in the specific run queue may have a lowest one of the highest task priorities possessed by tasks in the run queues $RQ_{21}$ and $RQ_{22}$. Since the highest task priority "4" possessed by the task $T_4$ in the run queue $RQ_{22}$ is lower than the highest task priority "3" possessed by the task $T_{31}$ in the run queue $RQ_{21}$, the scheduling unit 104 may select the run queue $RQ_{22}$ as the specific run queue to which the task $T_{32}$ will be added.

After the task scheduling of the task $T_{32}$ is accomplished/terminated, the run queue $RQ_{11}$ may include at least the task $T_2$, the run queue $RQ_{12}$ may include at least the task $T_1$, the run queue $RQ_{21}$ may include at least the task $T_{31}$, and the run queue $RQ_{22}$ may include at least the tasks $T_{32}$ and $T_4$. It should be noted that the task priority "3" of the task $T_{32}$ is higher than the task priority "4" of the task $T_4$. Hence, after the task $T_{32}$ is added to the run queue $RQ_{22}$, the task $T_{32}$ may become a task currently running on the second processor core Core_22, and the task $T_4$ may become a task waiting to run on the second processor core Core_22.

Figure 4:
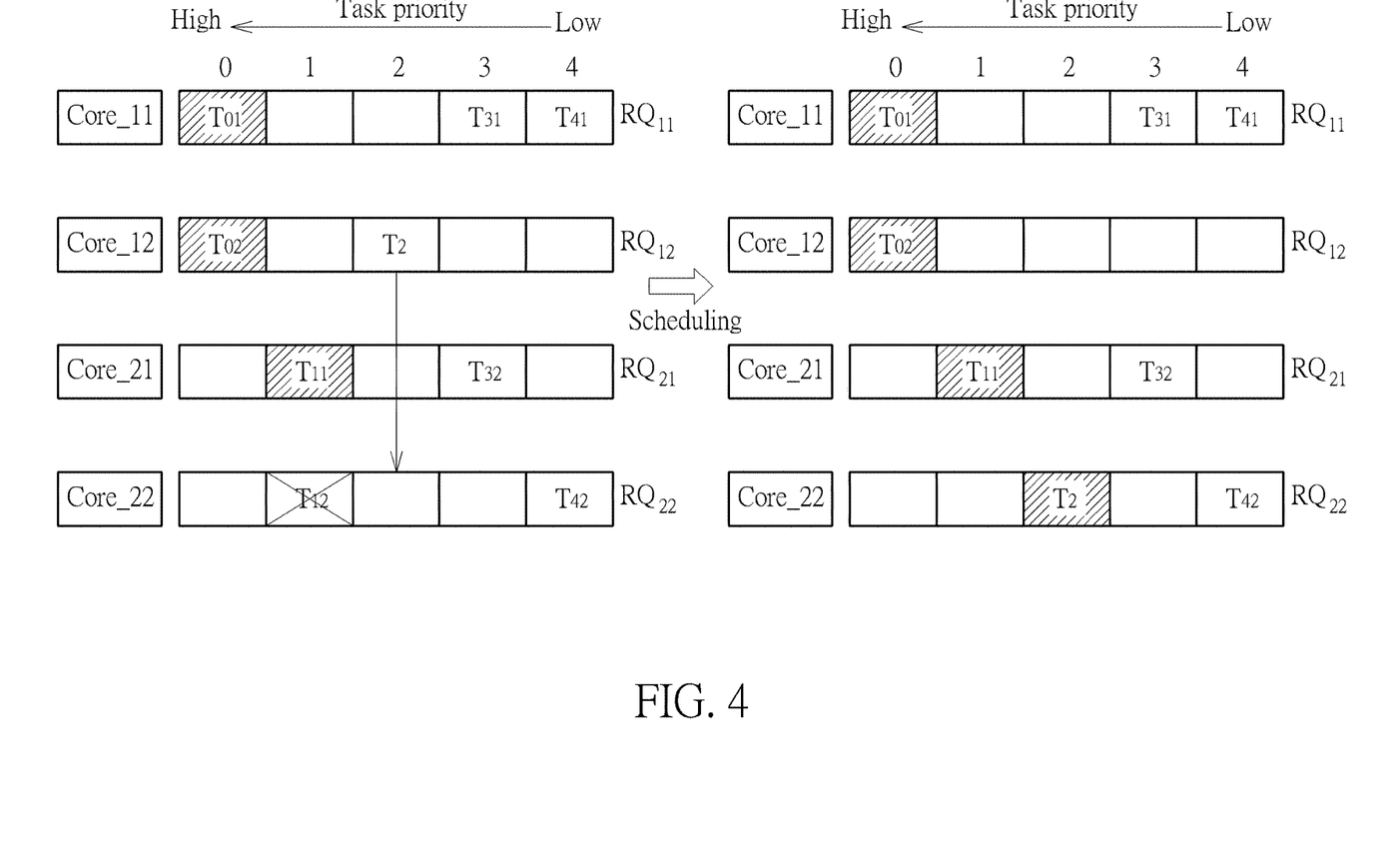
FIG. 4 is a diagram illustrating a third task scheduling operation which dispatches one second task belonging to the second priority task group (e.g., a next highest priority task group) to a run queue of one second processor core with lower computing power.

FIG. 4 is a diagram illustrating a third task scheduling operation which dispatches one second task belonging to the second priority task group to a run queue of one second processor core with lower computing power. In this example, before a task $T_{12}$ with the task priority "1" is removed from the run queue $RQ_{22}$, the run queue $RQ_{11}$ may include a task $T_{01}$ with the task priority "0" and may further include other tasks with lower task priorities (e.g., a task $T_{31}$ with the task priority "3" and a task $T_{41}$ with the task priority "4"); the run queue $RQ_{12}$ may include a task $T_{02}$ with the task priority "0" and may further include other tasks with lower task priorities (e.g., a task $T_2$ with the task priority "2"); the run queue $RQ_{21}$ may include a task $T_{11}$ with the task priority "1" and may further include other tasks with lower task priorities (e.g., a task $T_{32}$ with the task priority "3"); and the run queue $RQ_{22}$ may include the task $T_{12}$ with the task priority "1" and may further include other tasks with lower task priorities (e.g., a task $T_{42}$ with the task priority "4"). Before removal of the task $T_{12}$ in the run queue $RQ_{22}$ occurs, a task with the highest task priority in the run queue $RQ_{11}$ may be the task $T_{01}$, a task with the highest task priority in the run queue $RQ_{12}$ may be the task $T_{02}$, a task with the highest task priority in the run queue $RQ_{21}$ may be the task $T_{11}$, and a task with the highest task priority in the run queue $RQ_{22}$ may be the task $T_{12}$. Hence, before removal of the task $T_{12}$ in the run queue $RQ_{22}$ occurs, the tasks $T_{01}$, $T_{02}$, $T_{11}$, and $T_{12}$ may be currently running on the first processor core Core_11, the first processor core Core_12, the second processor core Core_21, and the second processor core Core_22, respectively.

In a case where the execution of the task $T_{12}$ is accomplished/terminated by the second processor core Core_22 (i.e., the second processor core Core_22 is at a time point to schedule), the scheduling unit 104 may remove the accomplished/terminated task $T_{12}$ from the run queue $RQ_{22}$ due to that the task $T_{12}$ is a terminated task now. In another case where the system resource(s) requested by the task $T_{12}$ currently running on the second processor core Core_22 is not available yet, the execution of the task $T_{12}$ may be stopped, and the scheduling unit 104 may remove the task $T_{12}$ from the run queue $RQ_{22}$ and add the task $T_{12}$ to a wait queue since the task $T_{12}$ needs to wait for the requested system resource(s). In either of these cases, the scheduling unit 104 may pull a task that is identified as a task belonging to the second priority task group and included in a run queue of one of the first processor cores Core_11 and Core_12 and the second processor cores Core_21 and Core_22 to the run queue $RQ_{22}$ in response to removal of the task $T_{12}$ having the highest task priority in the run queue $RQ_{22}$.

As mentioned above, the identifying unit 102 may be configured to perform task identification to determine the first priority task group (e.g., a highest priority task group) and the second priority task group (e.g., a next highest priority task group), where the size of the first priority task group may depend on the number of first processor cores with the first computing power, and the size of the second priority task group may depend on the number of second processor cores with the second computing power lower than the first computing power. In this example, there are two first processor cores Core_11 and Core_12 and two second processor cores Core_21 and Core_22. Consider a case where the size of the first priority task group is set to be equal to the number of first processor cores, and the size of the second priority task group is set to be equal to the number of second processor cores. After the task $T_{12}$ is removed from the run queue $RQ_{22}$, task priorities of two tasks $T_{01}$ and $T_{02}$ are not lower than task priorities of other tasks (e.g., $T_{11}$, $T_2$, $T_{31}$, $T_{32}$, $T_{41}$, and $T_{42}$), and task priorities of two tasks $T_{11}$ and $T_2$ are not higher than task priorities of tasks $T_{01}$ and $T_{02}$ and not lower than task priorities of other tasks (e.g., $T_{31}$, $T_{32}$, $T_{41}$ and $T_{42}$). Hence, the identifying unit 102 may identify tasks $T_{01}$ and $T_{02}$ as tasks belonging to the first priority task group, and may identify tasks $T_{11}$ and $T_2$ as tasks belonging to the second priority task group.

After the task $T_{12}$ is removed from the run queue $RQ_{22}$, the task $T_{42}$ waiting to run on the second processor core Core_22 becomes a task with the highest task priority in the run queue $RQ_{22}$. The task priorities of tasks $T_{11}$ and $T_2$ belonging to the second priority task group are higher than the task priority of the task $T_{42}$, where the task $T_2$ belonging to the second priority task group is included in the run queue $RQ_{12}$ of the first processor core Core_12. Hence, the scheduling unit 104 may pull the task $T_2$ from the run queue $RQ_{12}$ to the run queue $RQ_{22}$ to reduce or avoid undesired priority inversion. For example, after the task $T_{12}$ is removed from the run queue $RQ_{22}$, the scheduling unit 104 may pull the task $T_2$ belonging to the second priority task group from the run queue $RQ_{12}$ of the first processor core Core_12 to the run queue $RQ_{22}$ of the second processor core Core_22 when the task $T_2$ has the task priority that is the next highest task priority possessed by the run queue $RQ_{12}$ (i.e., the task $T_2$ in the run queue $RQ_{12}$ is a task waiting to run on the first processor core Core_12). For another example, after the task $T_{12}$ is removed from the run queue $RQ_{22}$, the scheduling unit 104 may pull the task $T_2$ belonging to the second priority task group from the run queue $RQ_{12}$ of the first processor core Core_12 to the run queue $RQ_{22}$ of the second processor core Core_22 when the task $T_2$ has the task priority that is next to the task priority of the removed task $T_{12}$. For yet another example, after the task $T_{12}$ is removed from the run queue $RQ_{22}$, the scheduling unit 104 may pull the task $T_2$ belonging to the second priority task group from the run queue $RQ_{12}$ of the first processor core Core_12 to the run queue $RQ_{22}$ of the second processor core Core_22 when the task $T_2$ has the task priority that is higher than the highest task priority possessed by one task (e.g., $T_{42}$) in the run queue $RQ_{22}$ that is waiting to run.

After the task scheduling of the task $T_2$ is accomplished/terminated, the run queue $RQ_{11}$ may include at least the tasks $T_{01}$, $T_{31}$, and $T_{41}$, the run queue $RQ_{12}$ may include at least the task $T_{02}$, the run queue $RQ_{21}$ may include at least the tasks $T_{11}$ and $T_{32}$, and the run queue $RQ_{22}$ may include at least the tasks $T_2$ and $T_{42}$. It should be noted that the task priority "2" of the task $T_2$ is higher than the task priority "4" of the task $T_{42}$. Hence, after the task $T_2$ is pulled from the run queue $RQ_{12}$ to the run queue $RQ_{22}$, the task $T_2$ may become a task currently running on the second processor core Core_22, and the task $T_{42}$ is still a task waiting to run on the second processor core Core_22.

In above example in FIG. 4, the task $T_2$ is pulled from the run queue $RQ_{12}$ to the run queue $RQ_{22}$. However, this is for illustrative purposes only, and is not meant to be a limitation of the present invention. In another case, the same task scheduling policy mentioned above may be followed to pull the task $T_2$ with the task priority "2" from a different run queue to the run queue $RQ_{22}$ with the task T12 removed therefrom. For example, when the task $T_2$ with the task priority "2" is included in the run queue $RQ_{11}$ rather than the run queue $RQ_{12}$, the task $T_2$ belonging to the second priority task group may be pulled from the run queue $RQ_{11}$ to the run queue $RQ_{22}$ after the task $T_{12}$ is removed from the run queue $RQ_{22}$. For another example, when the task $T_2$ with the task priority "2" is included in the run queue $RQ_{21}$ rather than the run queue $RQ_{12}$, the task $T_2$ belonging to the second priority task group may be pulled from the run queue $RQ_{21}$ to the run queue $RQ_{22}$ after the task $T_{12}$ is removed from the run queue $RQ_{22}$.

Figure 5:
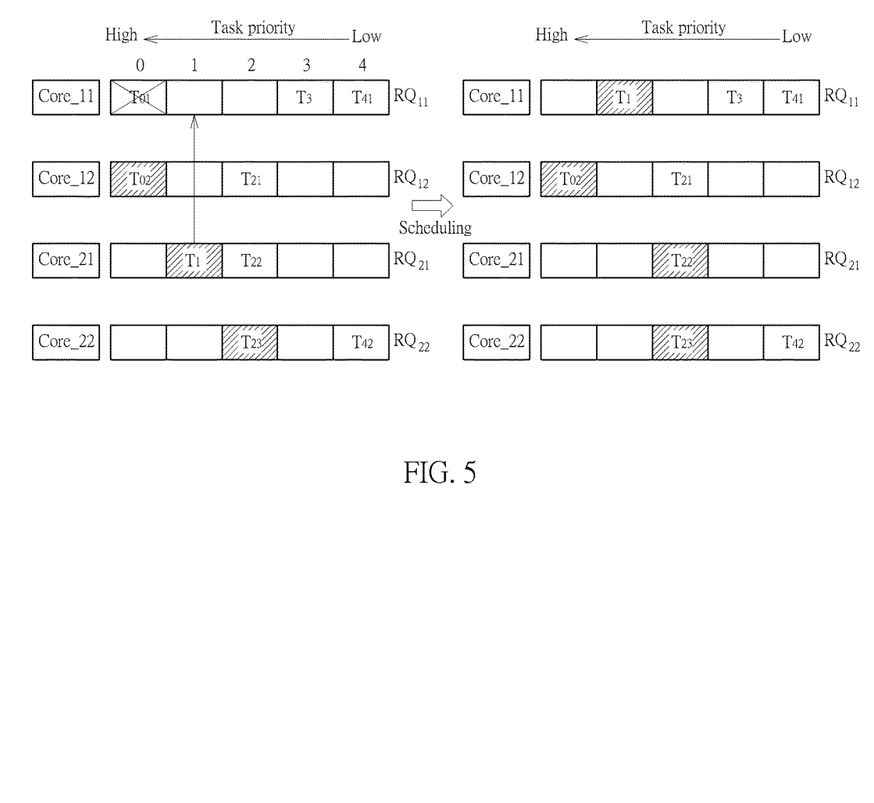
FIG. 5 is a diagram illustrating a fourth task scheduling operation which dispatches one first task belonging to the first priority task group (e.g., a highest priority task group) to a run queue of one first processor core with higher computing power.

FIG. 5 is a diagram illustrating a fourth task scheduling operation which dispatches one first task belonging to the first priority task group to a run queue of one first processor core with higher computing power. In this example, before a task $T_{01}$ with the task priority "0" is removed from the run queue $RQ_{11}$, the run queue $RQ_{11}$ may include a task $T_{01}$ with the task priority "0" and may further include other tasks with lower task priorities (e.g., a task $T_3$ with the task priority "3" and a task $T_{41}$ with the task priority "4"); the run queue $RQ_{12}$ may include a task $T_{02}$ with the task priority "0" and may further include other tasks with lower task priorities (e.g., a task $T_{21}$ with the task priority "2"); the run queue $RQ_{21}$ may include a task $T_1$ with the task priority "1" and may further include other tasks with lower task priorities (e.g., a task $T_{22}$ with the task priority "2"); and the run queue $RQ_{22}$ may include a task $T_{23}$ with the task priority "2" and may further include other tasks with lower task priorities (e.g., a task $T_{42}$ with the task priority "4"). Before removal of the task $T_{01}$ in the run queue $RQ_{11}$ occurs, a task with the highest task priority in the run queue $RQ_{11}$ may be the task $T_{01}$, a task with the highest task priority in the run queue $RQ_{12}$ may be the task $T_{02}$, a task with the highest task priority in the run queue $RQ_{21}$ may be the task $T_1$, and a task with the highest task priority in the run queue $RQ_{22}$ may be the task $T_{23}$. In addition, before removal of the task $T_{01}$ in the run queue $RQ_{11}$ occurs, the tasks $T_{01}$, $T_{02}$, $T_1$, and $T_{23}$ may be currently running on the first processor core Core_11, the first processor core Core_12, the second processor core Core_21, and the second processor core Core_22, respectively.

As mentioned above, a task may be removed from a run queue when execution of the task is accomplished/terminated or system resource(s) requested by the task is not available yet. In this example, the scheduling unit 104 may remove the task $T_{01}$ from the run queue $RQ_{11}$ due to any of above reasons. In addition, the scheduling unit 104 may pull a task that is identified as a task belonging to the first priority task group and included in a run queue of one of the second processor cores Core_21 and Core_22 and the first processor core Core_12 to the run queue $RQ_{11}$ in response to removal of the task $T_{01}$ having the highest task priority in the run queue $RQ_{11}$. Alternatively, the task $T_1$ may be a task waiting to run on the first processor core Core_11 at the time the task $T_{01}$ is removed from the run queue $RQ_{11}$. This also falls within the scope of the present invention.

There are two first processor cores Core_11 and Core_12 and two second processor cores Core_21 and Core_22. Consider a case where the size of the first priority task group is set to be equal to the number of first processor cores, and the size of the second priority task group is set to be equal to the number of second processor cores. After the task $T_{01}$ is removed from the run queue $RQ_{11}$, task priorities of two tasks $T_{02}$ and $T_1$ are not lower than task priorities of other tasks (e.g., $T_{21}$, $T_{22}$, $T_{23}$, $T_3$, $T_{41}$, and $T_{42}$), and task priorities of two tasks $T_{22}$ and $T_{23}$ are not higher than task priorities of tasks $T_{02}$ and $T_1$ and not lower than task priorities of other tasks (e.g., $T_{21}$, $T_3$, $T_{41}$ and $T_{42}$). Hence, the identifying unit 102 may identify tasks $T_{02}$ and $T_1$ as tasks belonging to the first priority task group, and may identify tasks $T_{22}$ and $T_{23}$ as tasks belonging to the second priority task group. It should be noted that identifying the tasks $T_{22}$ and $T_{23}$ as tasks belonging to the second priority task group is for illustrative purposes only. For example, any two of the tasks $T_{21}$, $T_{22}$ and $T_{23}$ having the same task priority "2" may be identified as tasks belonging to the second priority task group.

After the task $T_{01}$ is removed from the run queue $RQ_{11}$, the task $T_3$ waiting to run on the first processor core Core_11 becomes a task with the highest task priority in the run queue $RQ_{11}$. The task priorities of tasks $T_{02}$ and $T_1$ belonging to the first priority task group are higher than the task priority of the task $T_3$, where the task $T_1$ belonging to the first priority task group is included in the run queue $RQ_{21}$ of the second processor core Core_21. Hence, the scheduling unit 104 may instruct the run queue $RQ_{21}$ to release the task $T_1$ currently running on the second processor core Core_21, and grant the task $T_{22}$ in the run queue $RQ_{21}$ to be selected for running on the second processor core Core_21. And the scheduling unit 104 may pull the released task $T_1$ from the run queue $RQ_{21}$ to the run queue $RQ_{11}$ to reduce or avoid undesired priority inversion. For example, the scheduling unit 104 may pull the task $T_1$ belonging to the first priority task group from the run queue $RQ_{21}$ of the second processor core Core_21 to the run queue $RQ_{11}$ of the first processor core Core_11 when the highest task priority possessed by one task (e.g., $T_1$) in the run queue $RQ_{21}$ is the highest one of highest task priorities possessed by tasks (e.g., $T_1$ and $T_{23}$) in run queues of the second processor cores Core_21 and Core_22 and the task (e.g., $T_1$) with the highest task priority in the run queue $RQ_{21}$ has a task priority higher than the highest task priority possessed by one task (e.g., $T_3$) in the run queue $RQ_{11}$ that is waiting to run. For another example, the scheduling unit 104 may pull the task $T_1$ belonging to the first priority task group from the run queue $RQ_{21}$ of the second processor core Core_21 to the run queue $RQ_{11}$ of the first processor core Core_11 when the task $T_1$ has the task priority that is next to the task priority of the removed task $T_{01}$ and higher than the highest task priority possessed by one task (e.g., $T_3$) in the run queue $RQ_{11}$ that is waiting to run.

After the task scheduling of the task $T_1$ is accomplished/terminated, the run queue $RQ_{11}$ may include at least the tasks $T_1$, $T_3$ and $T_{41}$, the run queue $RQ_{12}$ may include at least the tasks $T_{02}$ and $T_{21}$, the run queue $RQ_{21}$ may include at least the task $T_{22}$, and the run queue $RQ_{22}$ may include at least the tasks $T_{23}$ and $T_{42}$. In this example, the scheduling unit 104 may further ensure that each first task belonging to the first priority task group is included in a run queue of one first processor core. As shown in FIG. 5, all of the tasks $T_1$ and $T_{02}$ belonging to the first priority task group are included in run queues $RQ_{11}$ and $RQ_{12}$ of the first processor cores Core_11 and Core_12.

It should be noted that the task priority "1" of the task $T_1$ is higher than the task priority "3" of the task $T_3$. Hence, after the task $T_1$ is pulled from the run queue $RQ_{21}$ to the run queue $RQ_{11}$, the task $T_1$ becomes a task currently running on the first processor core Core_11, and the task $T_3$ is still a task waiting to run on the first processor core Core_11.

All tasks to be executed on the heterogeneous multi-core processor 10 may be divided into real-time tasks and normal tasks based on the task priorities. Compared to the normal tasks, the real-time tasks have higher task priorities. For example, each of the real-time tasks may be given a task priority falling within a first priority range such as [0, 99], and each of the normal tasks may be given a task priority falling within a second priority range such as [100, 139]. In above embodiments, the proposed task scheduling method performed by the task scheduler 100 may be used for real-time task scheduling. Hence, the tasks scheduled using the proposed task scheduling method may be real-time tasks only. However, this is not meant to be a limitation of the present invention. In an alternative design, the proposed task scheduling method performed by the task scheduler 100 may be used for normal task scheduling. Hence, the tasks scheduled using the proposed task scheduling method may be normal tasks only. In another alternative design, the tasks scheduled using the proposed task scheduling method may include real-time task(s) and normal task(s). To put it simply, any task scheduler of an OS kernel that uses the proposed task scheduling method falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A task scheduling method for a heterogeneous multi-core processor system, the heterogeneous multi-core processor system including at least one first processor core each having first computing power and at least one second processor core each having second computing power lower than the first computing power, the task scheduling method comprising:

referring to task priorities of tasks of the heterogeneous multi-core processor system to identify at least one first task of the tasks that belongs to a first priority task group, wherein each first task belonging to the first priority task group has a task priority not lower than task priorities of other tasks belonging to a second priority task group, where a size of the first priority task group is formed depends on a number of the first processor cores with the first computing power and a size of the second priority task group is formed depends on a number of the second processor cores with the second computing power;

dispatching at least one of the at least one first task to at least one run queue of at least one of the at least one first processor core, but not to any run queue of at least one of the at least one second processor core; and executing the at least one first task by the at least one first processor core.

2. The task scheduling method of claim 1, wherein the task scheduling method ensures that each of the at least one first task is included in a run queue of one of the at least one first processor core.

3. The task scheduling method of claim 1, wherein at least one of the at least one first task that is to be dispatched is a specific task that is not included in run queues of the heterogeneous multi-core processor system.

4. The task scheduling method of claim 3, wherein the step of dispatching at least one of the at least one first task comprises:

selecting a specific run queue from the at least one run queue of the at least one first processor core, wherein a highest task priority possessed by one task in the specific run queue is a lowest one of any highest task priority possessed by tasks in the at least one run queue of the at least one first processor core; and adding the specific task to the specific run queue.

5. The task scheduling method of claim 1, wherein at least one of the at least one first task that is to be dispatched is a specific task included in a specific run queue of one of the at least one second processor core.

6. The task scheduling method of claim 5, wherein the specific task in the specific run queue has a task priority higher than a highest task priority possessed by one task in another specific run queue of one of the at least one first processor core; and the step of dispatching at least one of the at least one first task comprises:

pulling the specific task from the specific run queue of one of the at least one second processor core to the another specific run queue of one of the at least one first processor core.

7. The task scheduling method of claim 6, wherein before the pulling step is performed, a highest task priority possessed by one task in the specific run queue is a highest one of any highest task priority possessed by tasks in the at least one run queue of the at least one second processor core.

8. The task scheduling method of claim 1, wherein at least one of the tasks is a real-time task.

9. A task scheduling method for a heterogeneous multi-core processor system, the heterogeneous multi-core processor system including at least one first processor core each having first computing power and at least one second processor core each having second computing power lower than the first computing power, the task scheduling method comprising:

referring to task priorities of tasks of the heterogeneous multi-core processor system to identify at least one first task of the tasks that belongs to a first priority task group and identify at least one second task of the tasks that belongs to a second priority task group, wherein each first task belonging to the first priority task group has a task priority not lower than task priorities of second tasks belonging to the second priority task group, each second task belonging to the second priority task group has a task priority not lower than task priorities of other tasks not belonging to the first priority task group and the second priority task group, wherein a size of the first priority task group is formed depends on a number of the first processor cores with the first computing power and a size of the second priority task group is formed depends on a number of the second processor cores with the second computing power;

dispatching at least one of the at least one second task to at least one run queue of at least one of the at least one second processor core, but not to any run queue of at least one of the at least one first processor core; and executing the at least one of the at least one second task by the at least one second processor core.

10. The task scheduling method of claim 9, wherein at least one of the at least one second task that is to be dispatched is a specific task that is not included in run queues of the heterogeneous multi-core processor system.

11. The task scheduling method of claim 10, wherein the step of dispatching at least one of the at least one second task comprises:

selecting a specific run queue from the at least one run queue of the at least one second processor core, wherein a highest task priority possessed by one task in the specific run queue has a lowest one of any highest task priority possessed by tasks in the at least one run queue of the at least one second processor core; and adding the specific task to the specific run queue.

12. The task scheduling method of claim 9, wherein at least one of the at least one second task that is to be dispatched is a specific task included in a specific run queue of one of the at least one first processor core and the at least one second processor core.

13. The task scheduling method of claim 12, wherein the specific task has a task priority higher than a highest task priority possessed by one task in another specific run queue of one of the at least one second processor core; and the step of dispatching at least one of the at least one second task comprises:

pulling the specific task from the specific run queue to the another specific run queue.

14. The task scheduling method of claim 13, wherein in the specific run queue, the specific task has the task priority that is a next highest task priority.

15. The task scheduling method of claim 9, wherein at least one of the tasks is a real-time task.

16. A non-transitory computer readable medium storing a program code that, when executed by a heterogeneous multi-core processor system including at least one first processor core each having first computing power and at least one second processor core each having second computing power lower than the first computing power, causes the heterogeneous multi-core processor system to perform following steps:

referring to task priorities of tasks of the heterogeneous multi-core processor system to identify at least one first task of the tasks that belongs to a first priority task group, wherein each first task belonging to the first priority task group has a task priority not lower than task priorities of other tasks belonging to a second priority task group, where a size of the first priority task group is formed depends on a number of the first processor cores with the first computing power and a size of the second priority task group is formed depends on a number of the second processor cores with the second computing power;

dispatching at least one of the at least one first task to at least one run queue of at least one of the at least one first processor core, but not to any run queue of at least one of the at least one second processor core; and executing the at least one first task by the at least one first processor core.

17. The non-transitory computer readable medium of claim 16, wherein each of the at least one first task is ensured to be included in a run queue of one of the at least one first processor core.

18. The non-transitory computer readable medium of claim 16, wherein at least one of the tasks is a real-time task.

19. A non-transitory computer readable medium storing a program code that, when executed by a heterogeneous multi-core processor system including at least one first processor core each having first computing power and at least one second processor core each having second computing power lower than the first computing power, causes the heterogeneous multi-core processor system to perform following steps:

referring to task priorities of tasks of the heterogeneous multi-core processor system to identify at least one first task of the tasks that belongs to a first priority task group and identify at least one second task of the tasks that belongs to a second priority task group, wherein each first task belonging to the first priority task group has a task priority not lower than task priorities of second tasks belonging to the second priority task group, each second task belonging to the second priority task group has a task priority not lower than task priorities of other tasks not belonging to the first priority task group and the second priority task group, wherein a size of the first priority task group is formed depends on a number of the first processor cores with the first computing power and a size of the second priority task group is formed depends on a number of the second processor cores with the second computing power; and dispatching at least one of the at least one second task to at least one run queue of at least one of the at least one second processor core, but not to any run queue of at least one of the at least one first processor core; and executing the at least one of the at least one second task by the at least one second processor core.

20. The non-transitory computer readable medium of claim 19, wherein at least one of the tasks is a real-time task.

* * * * *